United States Patent
Paterek et al.

(10) Patent No.: US 6,938,481 B2
(45) Date of Patent: Sep. 6, 2005

(54) SIGHT GLASS AND LOW TEMPERATURE METHOD OF MANUFACTURING THE SAME

(75) Inventors: Dieter Paterek, Vroomshoop (NL);
Tariq Quadir, Westchester, OH (US);
Arjan Kolkman, Den Ham (NL); Scott Schuckmann, Maineville, OH (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/386,365

(22) Filed: Mar. 11, 2003

(65) Prior Publication Data

US 2003/0223139 A1 Dec. 4, 2003

Related U.S. Application Data

(63) Continuation-in-part of application No. 09/594,862, filed on Jun. 15, 2000, now abandoned.
(60) Provisional application No. 60/139,298, filed on Jun. 15, 1999.

(51) Int. Cl.[7] ............................................. G01F 23/02
(52) U.S. Cl. ......................................................... 73/323
(58) Field of Search ............................ 73/323, 330, 329, 73/334; 220/663; 116/276

(56) References Cited

U.S. PATENT DOCUMENTS

| | | | |
|---|---|---|---|
| 3,299,851 A | 1/1967 | Olsen | 116/117 |
| 3,438,540 A | 4/1969 | LeRoy | 220/46 |
| 3,837,226 A | 9/1974 | Kawawa | 73/331 |
| 3,941,460 A | 3/1976 | Meginnis | 350/319 |
| 3,942,881 A | 3/1976 | Meginnis | 350/319 |
| 3,951,301 A | 4/1976 | Meginnis | 220/328 |
| 3,957,359 A | 5/1976 | Meginnis | 350/319 |
| 3,977,251 A | 8/1976 | Meginnis | 73/334 |
| 4,162,826 A | 7/1979 | Van der Beck | 350/319 |

(Continued)

FOREIGN PATENT DOCUMENTS

WO      WO0077557 A1      12/2000

OTHER PUBLICATIONS

S–Bond™ Handbook, © MRi 2001.
Property Bulletin: S–Bond™ Alloy 220, Issue Date: Apr. 2000—Bulletin No. 14.01.05.
Material Safety Data sheet—S–Bond™ Alloy 220—Date of Preparation: Jan. 1998—Revision 2.
Property Bulletin: S–Bond™ Alloy 400, Issue Date: Nov. 2000—Bulletin No. 14.01.07.
Material Safety Data sheet—S–Bond™ Alloy 400—Date of Preparation: NOv. 2000—Revision 0.

*Primary Examiner*—Hezron Williams
*Assistant Examiner*—Rodney Frank
(74) *Attorney, Agent, or Firm*—Locke Liddell & Sapp LLP

(57) ABSTRACT

An improved lower cost sight glass and a method for producing the same is disclosed, whereby the sight glass is made by placing a transparent component in secure contact with a metallic ring. The contact may optionally be effectuated by temporarily altering the relative dimensions of the metallic ring and the transparent component, placing the transparent component into the inner space of the metallic ring, and then reversing the altered relative dimensions of the metallic ring and the transparent component. A hermetic seal is formed between the transparent component and the metallic ring is by the application of an inorganic sealing compound.

37 Claims, 4 Drawing Sheets

U.S. PATENT DOCUMENTS

| | | | |
|---|---|---|---|
| 4,169,309 A | 10/1979 | Meginnis | 29/447 |
| 4,182,179 A | 1/1980 | Meginnis | 73/334 |
| 4,206,537 A | 6/1980 | Meginnis | 29/447 |
| 4,224,047 A | 9/1980 | Kershaw | 65/39 |
| 4,436,375 A | 3/1984 | Meginnis | 350/319 |
| 4,468,095 A | 8/1984 | Meginnis | 350/319 |
| 4,472,223 A | 9/1984 | Bowsky | 156/153 |
| 4,515,437 A | 5/1985 | Story | 350/114 |
| 4,525,462 A | 6/1985 | Behr | 501/71 |
| 4,807,474 A | 2/1989 | Foster | 73/331 |
| 4,809,862 A * | 3/1989 | Canty | 220/663 |
| 4,877,668 A | 10/1989 | Hinz | 428/68 |
| 4,961,628 A | 10/1990 | Herberts | 350/319 |
| 5,125,269 A * | 6/1992 | Horst, Jr. | 73/323 |
| 5,176,029 A | 1/1993 | Dittrich | 73/323 |
| 5,210,658 A | 5/1993 | Foster | 359/894 |
| 5,243,929 A | 9/1993 | Brown | 116/276 |
| 5,456,245 A | 10/1995 | Bornhop | 600/139 |
| 5,776,276 A | 7/1998 | Goebel | 156/89 |
| 5,852,937 A | 12/1998 | Westermeyer | 62/125 |
| 6,047,876 A | 4/2000 | Smith | 228/111 |
| 6,231,693 B1 | 5/2001 | Lugscheider | 148/442 |
| 6,359,742 B1 | 3/2002 | Canty | 359/894 |

* cited by examiner

SIGHT GLASS AND LOW TEMPERATURE METHOD OF MANUFACTURING THE SAME

CROSS REFERENCE TO RELATED APPLICATION

This is a continuation-in-part of copending U.S. application Ser. No. 09/594,862, which was filed on Jun. 15, 2000 now abandoned, the entire disclosure of which is hereby incorporated by reference, which claims the priority of U.S. Provisional Application No. 60/139,298 filed Jun. 15, 1999.

FIELD OF THE INVENTION

This invention relates to sight glasses. More specifically, this invention relates to hermetically sealed sight glasses and to the relatively low-temperature methods that may be used to manufacture such sight glasses.

BACKGROUND OF THE INVENTION

There is perceived a need in industry today for a person or sensing device to be able to view the interior of many types of process vessels or containers used in industry. Often, such vessels will contain a corrosive or otherwise hazardous material, and/or its contents will be at elevated pressures and/or temperatures, so that the person wishing to look inside the vessel cannot safely open the vessel for direct viewing.

Sight glasses are commonly used to solve this problem, a sight glass typically comprising a transparent (or at least translucent) component, capable of allowing the viewer to sense the inside of the vessel, and a housing assembly, capable of holding the transparent component in place and attaching to a vessel whose interior it is wished to be viewed. Several varieties of sight glasses are available, each having its own set of limitations. For high pressure applications requiring a sight glass that is hermetically sealed, the prior art sight glasses tend to be made using a variety of methods.

One common method of sight glass manufacture is known as the fusion method. The fusion method includes a transparent component, typically a glass or similar fusible material, formed in the shape of a circular disc, and a metallic ring. The metallic ring is part of the housing assembly and is formed such that the transparent component is fused to the interior diameter of the metallic ring. An example of a sight glass constructed according to a fusion method is disclosed in U.S. Pat. No. 4,472,223 to Bowsky. In order to bond the transparent component to the metallic ring, the two components are heated to relatively high temperatures, traditionally about 800 to 1100 degrees Celsius, to fuse the glass to the metal. At these elevated temperatures, the transparent material becomes soft and flows into direct contact with the metallic material. In the resultant sight glass, the transparent component is bonded both chemically and physically to the metallic ring. Such sight glasses are typically pressure resistant and durable, but they are relatively expensive to manufacture, due to the costs associated with the equipment necessary for achieving the required elevated temperatures. Moreover, the required relatively high temperatures also make it difficult to use certain metallic ring materials, for example brass, which have lower melting point temperatures and/or have the tendency to undergo relatively rapid oxidation at high temperatures.

Under a second known method of sight glass construction, the transparent component is not fused to the metallic ring, but rather is mechanically held in place by one or more gasketing materials. An example of such a sight glass is disclosed in U.S. Pat. No. 4,169,309 to Meginnis. It is well known that such gasketing materials can be configured, along with the transparent component and the other elements of the housing assembly, in such a way that the gasketing material is placed in compression between a surface of the transparent component and a surface of at least one element of the housing assembly. Such configurations can form a sight glass that is semi-hermetic (less than $1 \times 10^{-5}$ atms/cc sec) sealed. However, sight glasses made using gasketing materials can be expensive, due to the multiplicity of parts and the labor required for their assembly being mostly of polymeric nature. Moreover, such sight glasses cannot be used in situations where the gasketing materials are incompatible with the temperatures, pressures, and/or corrosive conditions expected inside the process vessel whose interior it is wished to be viewed.

Thus it is an object of this invention to provide a simple, cost-effective method of manufacturing a hermetically-sealed sight glass that avoids the disadvantages of the prior art.

DESCRIPTION OF THE FIGURES

The following figures form part of the present specification and are included to further demonstrate certain aspects of the present invention. The invention may be better understood by reference to these drawings in combination with the detailed description of specific embodiments presented herein.

DETAILED DESCRIPTION OF THE PREFERRED EMBODIMENTS

Figure 1:
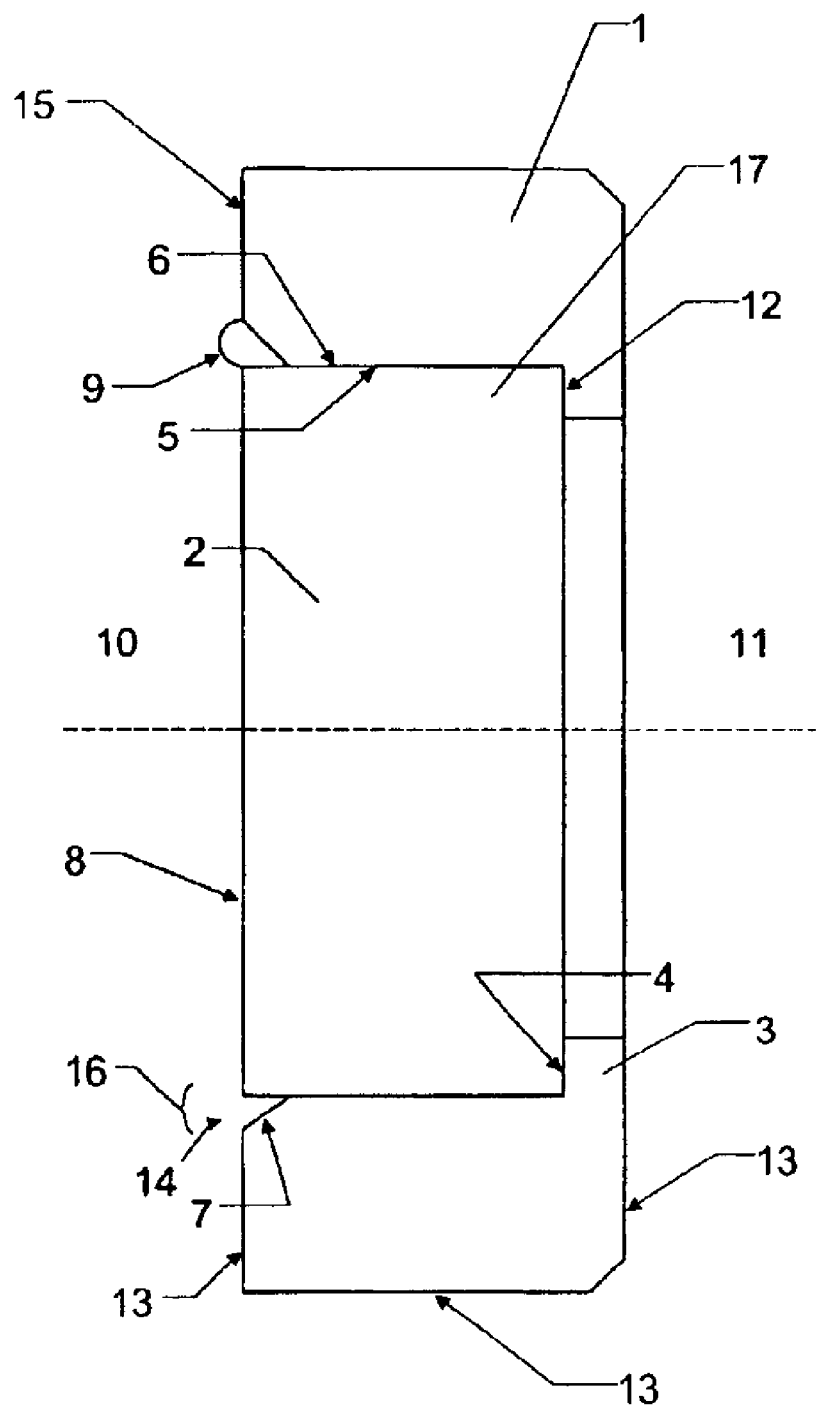
FIG. 1 shows a cross-sectional view of a first sight glass made according to certain features of the present invention.

Turning now to the Figures, and in particular FIG. 1, a cross-sectional view of a sight glass made according to certain features of the present invention is shown. The illustrated sight glass includes a metallic ring 1 securely holding a transparent component 2 in compression, a hermetic seal being assured along the interface between the metallic ring 1 and the transparent component 2 by means of a sealing compound 9. (The region 14 is shown without sealing compound 9 for clarity.)

According to the present invention, the metallic ring 1 may be comprised of any suitable metal, metal alloy, metalloid, or similar material. Suitable metals include stainless steels, cold-rolled steels (CRS), and other ferrous alloys (which may or may not be nickel-plated), as well as aluminum. It will be understood that the term "metallic ring" includes any suitably shaped material having an inner space capable of receiving and holding a transparent component, and having peripheral surfaces 13 capable of being joined to other elements of a sight glass housing assembly (not shown). The outer surfaces of the metallic ring may form a circular disc, a rectangular plate, or any other shape suitable for being joined to other elements of a sight glass housing assembly.

According to one embodiment of the present invention, the transparent component 2 may be any fusible or non-fusible glass, crystalline material, or ceramic material single crystal and poly-crystal, such materials being well known in the art. For example, borosilicates, soda lime silicates and sapphire (crystalline) are useful materials from which transparent component 2 may be made. The shape of the transparent component 2 may be a circular disc as shown in the figures, but it is not so limited. Transparent component 2 may also be a rectangular plate, a hexagonal plate, or any other suitable shape. Inner space 17 of metallic ring 1 is shaped to receive transparent component 2.

In one preferred embodiment shown in FIG. 1, a sight glass made according to the present invention is placed in service such that an inner environment 10 is separated by the sight glass from an outer environment 11. Inner environment 10 contains the conditions that are desired to be viewed. Metallic ring 1 includes a lip piece 3 having a surface 12 abutting a marginal portion 4 of the transparent component 2. Lip piece 3 limits the insertion of transparent component 2 into metallic ring 1. In addition, when inner environment 10 is of a higher pressure than outer environment 11, transparent component 2 is forced against lip piece surface 12, thus facilitating an enhanced seal and greater support of transparent component 2.

As will be described in greater detail, an inner surface 6 of metallic ring 1 may be in compressive contact with an outer surface 5 of transparent component 2 as shown in the FIG. 1–3. Such compressive contact is sufficient to hold the transparent component securely in place. However, the compressive contact alone may not be sufficient to form a hermetic seal along this compressive interface. Thus, it is advantageous to use an inorganic sealing compound 9 along region 16 where the compressive interface between metallic ring 1 and transparent component 2 is exposed to the inner environment 10.

Suitable inorganic sealing compounds include fusible low temperature melting glasses. Preferably, the glass softening temperature of the melting glass is at least 25 degrees C. lower than any glass transition temperature of the transparent component. More preferably, the glass softening temperature of the melting glass is at least about 50 degrees C. lower than any glass transition temperature of the transparent component. Examples of low temperature melting glasses include "2998" VEG from Ferro Corporation, Corning "9013" (alkali barium), and Fusite T-glass 435. The low temperature melting glass may be employed in the form of a preform paste or dry pressed sprayed dry powder consisting of glass particles and a suitable binder material. Alternatively, the low temperature melting glass may be in the form of cut glass tubing suitably cut into rings of appropriate dimensions. The use of a low temperature melting glass having a glass softening temperature at least about 25 degrees C. (preferably 50 degrees C.) lower than any glass transition temperature of the transparent component is particularly advantageous in that the low temperature melting glass may thereby be fused to the transparent component and metallic component using relatively low temperatures, for example, about 650 degrees C. when soda lime silica glass having a glass transition temperature of about 685 degrees C. is utilized as a transparent component material, without any appreciable loss of clarity or significant degradation to the transparent component, and without any significant degradation to the metallic component. By the present invention, there may therefore be employed relatively inexpensive amorphous glass transparent component materials, such as borosilicates, soda lime silicates, and the like. Moreover, by the present invention, there may also therefore be employed metallic component materials of relatively low cost, for example, nickel-plated CRS and the like.

Preferably, the material comprising the low temperature melting glass and the material comprising the transparent component are chosen to exhibit compatible coefficients of thermal expansion. Preferably, the two materials exhibit coefficients of thermal expansion that are within about 4 in/in/° C.$\times 10^{-6}$ of each other. More preferably, the two materials exhibit the same or nearly the same coefficients of thermal expansion.

Moreover, when the metallic component comprises aluminum, the low temperature melting glass may preferably comprise one or more aluminum-containing glasses.

According to one preferred embodiment shown in FIG. 1, an inner edge surface 7 on the inner environment side 10 of metallic ring 1 is beveled. Such beveling forms a trench-like region 14 into which a sealing compound 9 may be applied. For example, edge surface 7 of metallic ring 1 may be beveled to about 45 degrees and 0.0015 inches, although these dimensions are not critical. One advantage to beveling inner surface 7 of metallic ring 1 is that when the sight glass is placed in a service application in which the inner environment 10 is of higher pressure than the outer environment 11, sealing compound 9 is compressed by both the beveled surface 7 and the exposed portion of the transparent component outer surface 5. Such compression of the sealing compound increases the sealing compound's structural integrity to maintain the hermetic seal. According to this embodiment, hermetic properties to $10^{-9}$ atmscc/sec may be obtained.

Figure 2:
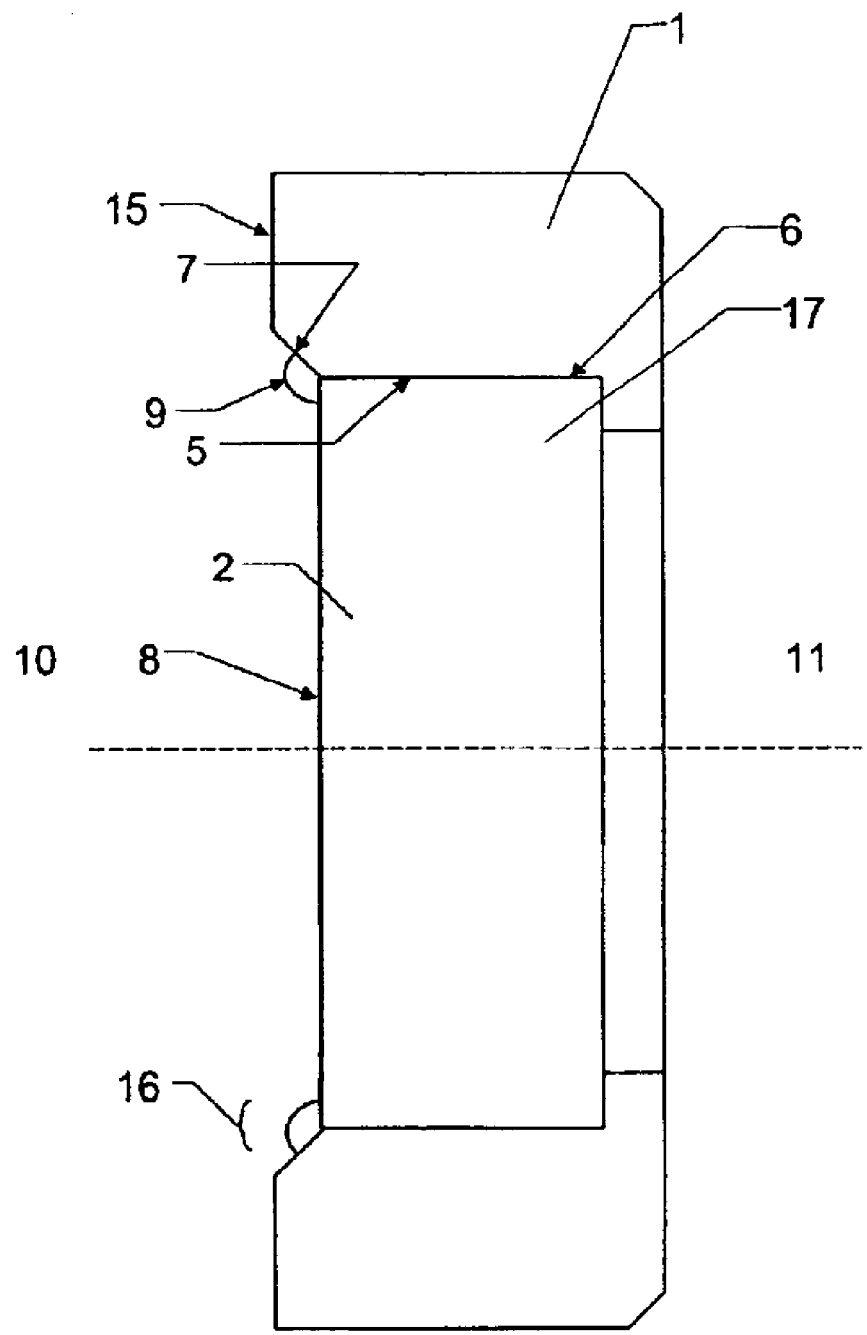
FIG. 2 shows a cross-sectional view of a second sight glass made according to certain features of the present invention.

Referring next to FIG. 2, there is shown a cross-sectional view of a sight glass made according to certain other features of the present invention. Beveled inner surface 7 of metallic ring 1 extends beyond an inner surface 8 of transparent component 2. In this configuration, metallic ring 1 and the transparent component 2 come together without forming a trench-like region for holding the sealing compound 9. However, the sealing compound 9 is still subject to at least some compressive forces upon exposure to higher pressure environment 10.

Figure 3:
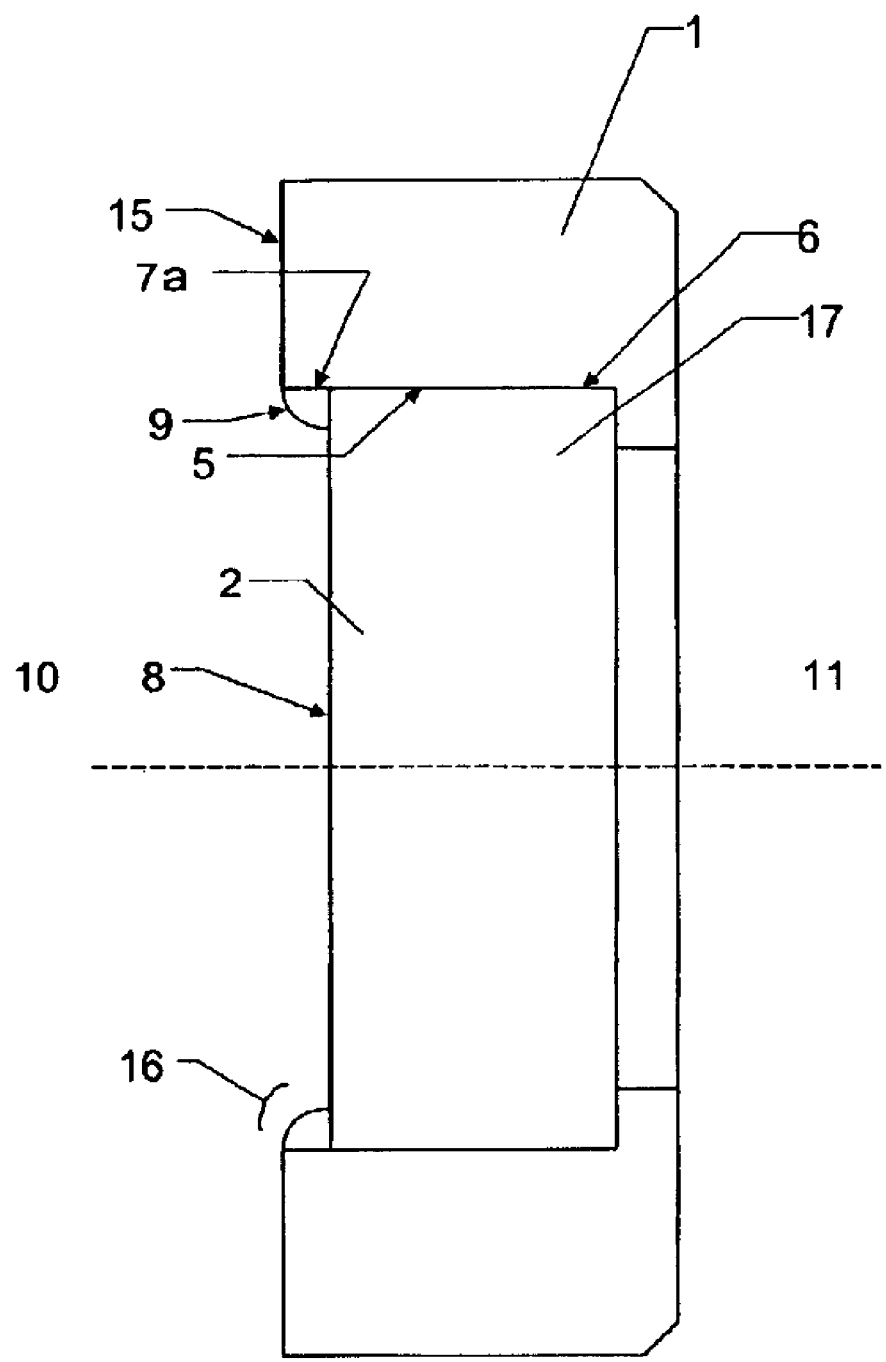
FIG. 3 shows a cross-sectional view of a third sight glass made according to certain features of the present invention.

In still another embodiment of the present invention, as shown in FIG. 3, the inner surface 7a of the metallic ring 1 is not beveled, and transparent component 2 is of reduced width relative to that of metallic ring 1 such that ring surface 15 extends beyond surface 8 of transparent component 2. In this embodiment, the sealing compound 9 is subject to some compressive forces upon exposure to higher pressure environment 10.

In still other embodiments, not shown, transparent component 2 may be of increased width relative to that of metallic ring 1, such that surface 8 of transparent component 2 extends beyond surface 15 of metallic ring 1. In these embodiments, inner surface 8 of metallic ring 1 may or may not be beveled, and these embodiments are included within the scope of the present invention.

It will be understood that there are other configurations possible for forming a trench-like region at the interface of transparent component 2, metallic ring 1, and inner environment 10. Such configurations, to the extent that they are capable of compressing and thereby improving the efficacy of sealing compound 9, are included within the scope of the present invention.

Figure 4:
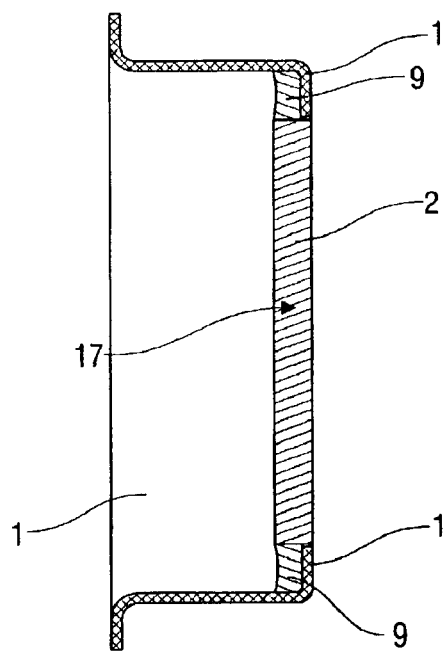
FIG. 4 shows a cross-sectional view of a fourth sight glass made according to certain features of the present invention.
Figure 5:
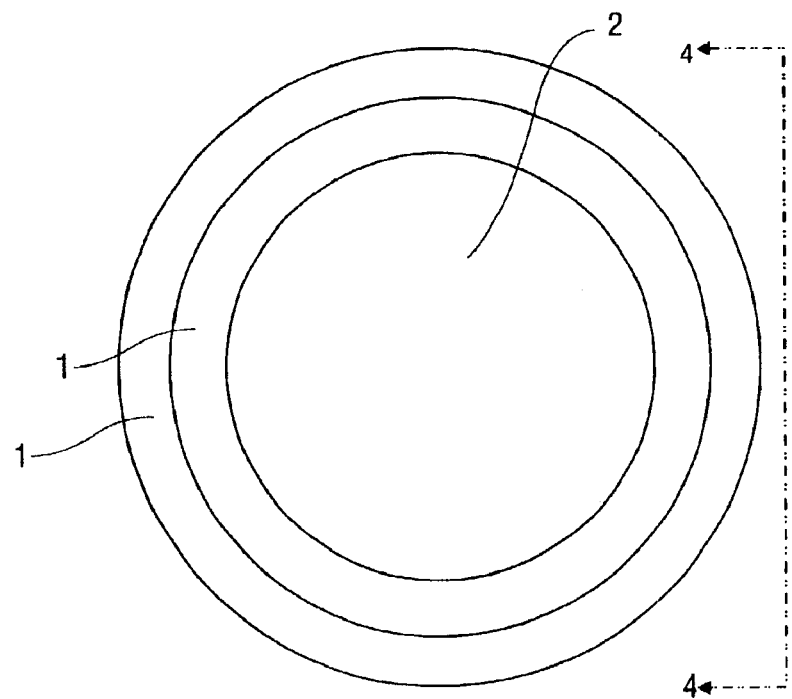
FIG. 5 shows a side view of the fourth sight glass made according to certain features of the present invention.

In still another embodiment of the present invention, as shown in FIGS. 4 and 5, the transparent component 2 is not held in compressive contact with the metallic ring 1, but rather is secured in place by the sealing compound 9. In this embodiment, it is preferred that such sealing compound comprise a low temperature melting glass fused to both the transparent component 2 and the metallic ring 1. In such an embodiment, the metallic ring 1 may abut against the transparent component 2, or there may be a slight gap between the transparent component 2 and the metallic ring 1 that may be at least partially filled by the low temperature melting glass.

Optionally, the present invention may employ a curable high temperature cement to secure and partially seal the transparent component 2 to the metallic ring 1 (not shown in the figures). Suitable high temperature cements include, for example, Ceramabond® 571 brand (magnesium oxide) high temperature ceramic adhesive. In these embodiments, the high temperature cement may be employed in a space between the transparent component and the metallic ring, and the preferred low temperature melting glass may then be applied on top of the high temperature cement to seal off the porosity of the cement.

When the transparent component is to be held in compressive contact with the metallic ring, one method for making the present invention may include the steps of (a) temporarily altering the relative dimensions of metallic ring 1 and transparent component 2; (b) placing transparent component 2 within inner space 17 of metallic ring 1; (c) reversing the altered relative dimensions of the metallic ring and the transparent component, such that the metallic ring holds the transparent component securely in compression; (d) applying a sealing compound 9 to a region 16 along the exposed interface between metallic ring 1 and transparent component 2; and (e) conditioning sealing compound 9 as necessary to assure a hermetic seal of region 16 at the interface exposed to inner environment 10 between metallic ring 1 and transparent component 2.

The relative dimensions of the metallic ring and the transparent component may most easily be altered by means of heating either the metallic ring alone or the metallic ring together with the transparent component. (It will be understood by those of ordinary skill in the art with the benefit of this disclosure that the vast majority of materials expand in a predictable manner when exposed to higher temperatures. It will also be understood that metallic materials typically expand to a greater extent than glasses, ceramics, and other non-metallic materials, i.e. metals typically have a greater coefficient of thermal expansion than glasses, ceramics, and other non-metallics.)

In some embodiments of the present invention, it may be necessary to provide metallic ring 1 with inner space 17 having dimensions slightly smaller than the dimensions of transparent component 2 at ambient conditions. This ensures that the metallic ring will be capable of holding the transparent component securely in compressive contact.

In a typical example, metallic ring 1 may be made from nickel-plated CRS or stainless steel and have a cylindrical inner space 17 with a diameter of 18.66 mm at ambient conditions. Transparent component 2 may be in the form of a cylindrical disc made from borosilicate and have a diameter of 18.80 mm. Thus, when metallic ring 1 is heated to 400 degrees Celsius or higher, the diameter of inner space 17 of the metallic ring will increase to the extent that unheated transparent component 2 may be inserted into the inner space of the metallic ring.

According to one method of the present invention, when only metallic ring 1 is heated, transparent component 2 (maintained at ambient temperature) may easily be inserted, manually or otherwise, into inner space 17 of the metallic ring while the metallic ring is at elevated temperatures. If metallic ring 1 is heated together with transparent component 2, it may of course be necessary to use special, heat-resistant material handling devices (not shown) in order to place the transparent component inside the inner space of the metallic ring.

It will be understood by those of ordinary skill in the art with the benefit of this disclosure that when metallic ring 1 and transparent component 2 are heated together, proper assembly will likely require that the materials for both be chosen such that the overall coefficient of thermal expansion (CTE) of the ring material is greater than that of the transparent component material. In typical embodiments, metallic ring 1 is a metal (although this is not necessarily so) and transparent component 2 is a glass or ceramic (having a relatively low CTE compared to most metals), thus providing sufficient CTE differences to allow the insertion of transparent component 2 into metallic ring 1 at elevated temperatures.

According to one preferred embodiment, metallic ring 1, alone or along with transparent component 2, is heated to about 250 to 800 degrees Celsius. This range of temperatures will typically be adequate to finally produce a securely fitted metallic ring/transparent component combination. One advantage of the present invention is that this range of temperatures is low enough to enable the use of certain metallic materials that could otherwise not be used as a materials for metallic rings for sight glasses made via fusion methods. This is because many previously-excluded metallic ring materials degrade at the higher temperatures required by fusion methods. The various forms of degradation are well known in the art, and may include oxidation, selective component evaporation and simple melting and/or other undesired change in metallic crystalline structure.

Once the metallic ring 1/transparent component 2 combination has cooled to ambient conditions, it will be understood that a variety of methods known to those of ordinary skill with the benefit of this disclosure may be used to apply various sealing compounds, such as low temperature melting glasses, to region along the exposed interface between metallic ring 1 and transparent component 2. Moreover, it will be understood that when there is employed a low temperature melting glass preform paste, the paste is typically first sintered at relatively low temperatures to remove its binder, and then heated at higher temperatures to fuse the remaining melting glass particles.

Those skilled in the art will appreciate that there are other methods and combinations of methods possible for temporarily altering the relative dimensions of metallic ring 1 and transparent component 2. For example, the transparent component may be cooled, while at the same time the metallic ring may be either heated or kept at ambient temperatures. This and other variations aimed at temporarily altering the relative dimensions of metallic ring 1 and the transparent component 2 are intended to be within the scope of the present invention.

When the transparent component is not to be held in compressive contact with the metallic ring, one method for making the present invention may include the steps of (a) placing the transparent component 2 within the inner space 17 of the metallic ring 1; (b) applying a low temperature melting glass sealing compound 9 around the interface between the transparent component 2 and the metallic ring 1; (c) sintering the low temperature melting glass sealing compound to at least partially secure the transparent component 2 to the metallic ring 1; (d) optionally fixing the metallic ring to other portions of a housing assembly of a sight glass assembly; and (e) heating the low temperature melting glass sealing compound to a temperature sufficient to fuse the melting glass sealing compound, and sufficient to seal the low temperature melting glass sealing compound to the transparent component 2 and the metallic ring 1, thereby forming a hermetic seal between the transparent component 2 and the metallic ring 1.

Preferably, the low temperature melting glass sealing compound and the transparent component are chosen such that the glass softening temperature of the low temperature melting glass sealing compound is lower than any glass transition temperature of the transparent component 2. More preferably, the low temperature melting glass sealing compound and the transparent component are chosen such that the glass softening temperature of the low temperature melting glass is at least about 25 degrees C. less than any glass transition temperature of the transparent component 2. More preferably still, the low temperature melting glass sealing compound and the transparent component are chosen such that the glass softening temperature of the low temperature melting glass is at least about 50 degrees C. less than any glass transition temperature of the transparent component 2. Preferably, the step of fusing the melting glass sealing compound may be performed at a temperature of from about 500 to 650 degrees C., or more preferably, at a temperature of from about 575 to 620 degrees C. Preferably, this fusing step may be performed in a special atmosphere, that is, a reducing atmosphere.

Those skilled in the art will appreciate that other embodiments are possible according to the present invention, and that the scope of the present invention is not limited to the specific embodiments disclosed herein.

What is claimed is:

1. A sight glass apparatus comprising:

a transparent component;

a metallic ring having an inner space receptive of the transparent component, wherein the transparent component is secured within the ring; and an inorganic sealing compound applied to an interface between the transparent component and the ring, wherein the inorganic sealing compound comprises fusible low temperature melting glass, and wherein the low temperature melting glass is in fused contact with both the ring and the transparent component.

2. The apparatus of claim 1 wherein the ring comprises at least one metal selected from the group consisting of ferrous alloys and aluminum.

3. The apparatus of claim 1 wherein the transparent component comprises a crystalline material.

4. The apparatus of claim 3 wherein the transparent component is secured within the ring by the low temperature melting glass.

5. The apparatus of claim 2 wherein the transparent component comprises a material exhibiting a glass transition temperature, and wherein low temperature melting glass exhibits a glass softening temperature lower than the glass transition temperature of the transparent component.

6. The apparatus of claim 5 wherein the transparent component comprises borosilicate or soda lime silicate.

7. The apparatus of claim 5 wherein the low temperature melting glass exhibits a glass softening temperature at least about 25 degrees C. lower than the glass transition temperature of the transparent component.

8. The apparatus of claim 7 wherein the low temperature melting glass exhibits a glass softening temperature at least about 50 degrees C. lower than the glass transition temperature of the transparent component.

9. The apparatus of claim 5, further comprising a high temperature cement securing the transparent component within the ring, the low temperature melting glass further being in fused contact with the high temperature cement.

10. The apparatus of claim 8 wherein the transparent component is secured within the ring by the low temperature melting glass.

11. The apparatus of claim 2 wherein the transparent component is secured in radial compression within the ring.

12. The apparatus of claim 11 wherein the ring further comprises a lip adapted to abut an outer surface of at least a portion of the transparent component, the lip arranged to limit the insertion distance of the transparent component into the ring.

13. The apparatus of claim 12 further comprising a beveled surface forming a region to accommodate the application of the low temperature melting glass.

14. The apparatus of claim 11 wherein the ring exhibits a greater coefficient of thermal expansion than the transparent component.

15. The apparatus of claim 14 wherein the ring comprises single-piece construction.

16. The apparatus of claim 1 wherein the transparent component is circular, rectangular, elliptical, or polygonal.

17. A sight glass comprising:

a means for sensing conditions on one side of the sight glass from the vantage point of the opposite side of the sight glass;

a means for securing the sensing means,
      the securing means securing the sensing means within the securing means, the securing means comprising a metallic ring, and a means for sealing an interface between the securing means and the sensing means, the sealing means comprising fusible low temperature melting glass, the fusible low temperature melting glass being in fused contact with both the metallic ring and the sensing means.

18. The sight glass of claim 17 wherein the sensing means comprises a material exhibiting a glass transition temperature, and wherein sealing means exhibits a glass softening temperature lower than the glass transition temperature of the sensing means.

19. The sight glass of claim 17 wherein the sensing means is secured in compression within the securing means when the sight glass is at ambient temperatures.

20. The sight glass of claim 19 wherein the securing means further comprises a lip means adapted to abut an outer surface of at least a portion of the sensing means.

21. The sight glass of claim 19, further comprising a beveled surface forming a region to accommodate the application of the sealing means.

22. A method of making a sight glass comprising the steps of:

providing a transparent component and a ring;
      the ring having an inner space, placing the transparent component inside the inner space of the ring;

applying an inorganic sealing compound around the interface between the transparent component and the ring;

treating the inorganic sealing compound to at least partially secure the transparent component to the ring; and further treating the inorganic sealing compound to seal the transparent component to the ring so as to form a hermetic seal between the transparent component and the ring wherein the inorganic sealing compound comprises fusible low temperature melting glass.

23. The method of claim 22 wherein the step of treating the inorganic sealing compound to at least partially secure the transparent component to the ring comprises sintering low temperature melting glass.

24. The method of claim 23 the step of further treating the inorganic sealing compound to seal the transparent component to the ring comprises fusing the low temperature melting glass to both the transparent component and the ring.

25. The method of claim 24, wherein the step of further treating the inorganic sealing compound is performed in a reducing atmosphere.

26. The method of claim 22 wherein the transparent component is secured within the ring by the low temperature melting glass.

27. The method of claim 24 wherein the transparent component comprises a crystalline material.

28. The method of claim 26 wherein the transparent component comprises a material exhibiting a glass transition temperature, and wherein low temperature melting glass exhibits a glass softening temperature lower than the glass transition temperature of the transparent component.

29. The method of claim 28 wherein the transparent component comprises borosilicate or soda lime silicate.

30. The method of claim 28 wherein the low temperature melting glass exhibits a glass softening temperature at least about 25 degrees C. lower than the glass transition temperature of the transparent component.

31. The method of claim 28 wherein the low temperature melting glass exhibits a glass softening temperature at least about 50 degrees C. lower than the glass transition temperature of the transparent component.

32. The method of claim 24 further comprising the steps of
temporarily altering the relative dimensions of the ring and the transparent compound prior to placing the transparent component inside the inner space of the ring, and
reversing the altered relative dimensions of the ring and transparent component after placing the transparent component inside the inner space of the ring;
the transparent component and the inner space of the ring being sized such that at ambient conditions, the ring holds the transparent component secured in a state of radial compression within the inner space of the ring.

33. The method of claim 32 wherein the step of temporarily altering the relative dimensions of the ring and transparent component comprises heating the ring.

34. The method of claim 32 wherein the step of temporarily altering the relative dimensions of the ring and transparent component comprises cooling the transparent component.

35. The method of claim 32 wherein the step of temporarily altering the relative dimensions of the ring and transparent component comprises heating both the ring and the transparent component.

36. The method of claim 32 wherein the ring comprises a lip adapted to abut an outer surface of at least a portion of the transparent component, the lip arranged to limit the insertion distance of the transparent component into the ring.

37. The method of claim 32 wherein the ring comprises beveled surface forming a region to accommodate the application of the low temperature melting glass.

* * * * *

UNITED STATES PATENT AND TRADEMARK OFFICE
CERTIFICATE OF CORRECTION

PATENT NO. : 6,938,481 B2
DATED : September 6, 2005
INVENTOR(S) : Paterek et al.

It is certified that error appears in the above-identified patent and that said Letters Patent is hereby corrected as shown below:

<u>Column 3,</u>
Lines 28-29, change "the FIG.1-3" to -- FIGS 1-3 --.

<u>Column 9,</u>
Line 10, after "23", insert -- wherein --.

Signed and Sealed this

Fourth Day of April, 2006

JON W. DUDAS
*Director of the United States Patent and Trademark Office*